May 2, 1967  M. H. LOVELACE  3,316,637
CUTTING TOOL
Filed Aug. 10, 1965
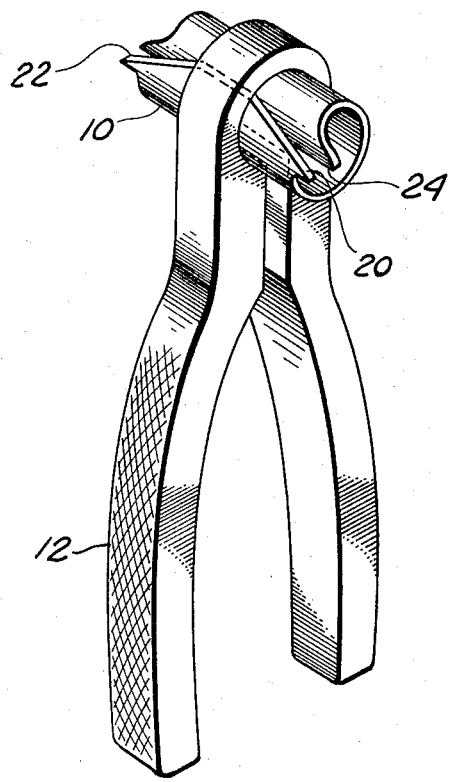
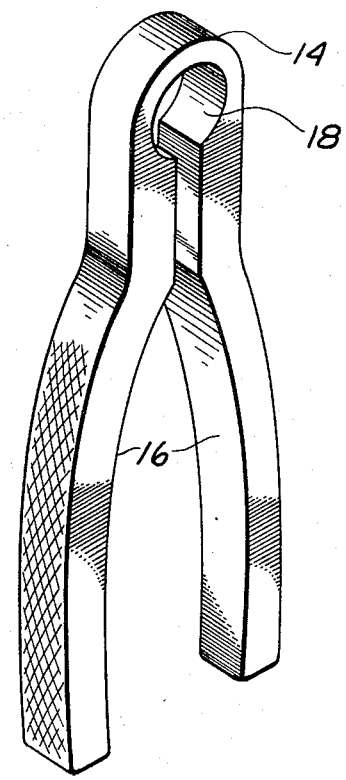
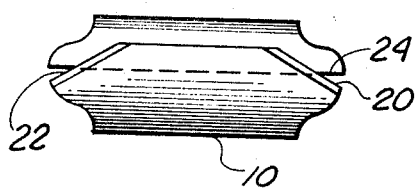
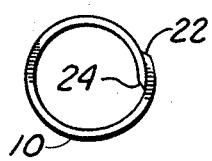
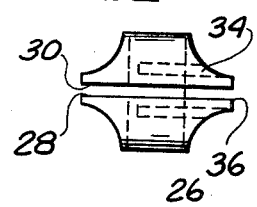
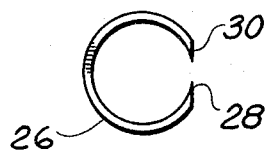
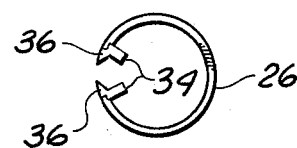
INVENTOR.
MONTE H. LOVELACE
BY Robert Smith
ATTORNEY

United States Patent Office 3,316,637
Patented May 2, 1967

3,316,637
CUTTING TOOL
Monte H. Lovelace, San Fernando, Calif., assignor to
The Bendix Corporation, a corporation of Delaware
Filed Aug. 10, 1965, Ser. No. 478,551
4 Claims. (Cl. 30—240)

This invention relates to cutting tools and more particularly to a tool for the cutting of metal ribbon or wire such as is often used to tie electrical terminals together in electronic modular units.

In cutting tools to be used in the cutting of metal ribbon or wire which ties electrical terminals together on electronic modular units, there is a need for a tool which permits cutting of the wire closer to the workpiece, a tool which permits the interchanging of cutting elements, a tool which is inexpensive to manufacture, simple to operate, and yet has a greater durability and efficiency than cutting tools presently in use.

Heretofore, cutter type pliers, blunt and long-nose side cutters, crimpers, nippers, dikes, and shears have been used but in some applications have not provided the quality of performance desired. With the presently existing tools, it is not possible to cut in close to the workpiece because of the complexity and small size of the electronic modular units. Also, adjacent terminals can be damaged because of the play that is inherent in present-day tools. In addition, when the presently used tools become dull, the whole unit has to be replaced or sent to be sharpened. This limitation requires technicians to carry at least two of each tool required in his work. Accordingly, it is an object of this invention to provide a cutting tool of the type described which permits cutting action closer to the workpiece with less chance of damage to adjacent elements.

It is another object of this invention to provide a cutting tool which is free from play.

A further object of this invention is to provide a cutting tool of the type described which is simple in consruction and operation but has a high degree of durability and is efficient in use.

A further object of this invention is to provide a cutting tool of the type described which is simple in construction and operation but has a high degree of durability and is efficient in use.

Yet another object of this invention is to provide a cutting tool which permits a multiplicity of cutters to be used interchangeably in the holding device.

Briefly stated, our improved cutting tool consists of two members, one of which is a unitary holding device which operates similar to a plier, and the other is a cylindrical cutting member which is insertable in the holding device. Thus when the holder is squeezed, the cutting member is deformed to produce a cutting action.

The invention will be better understood from the detailed description which follows herebelow, and the drawings, in which:

FIGURE 1 is a perspective view of one embodiment of the assembled cutting tool;

FIGURE 2 is a perspective view of the holding device;

FIGURE 3 is a side view of the cutting member shown in FIGURE 1;

FIGURE 4 is an end view of the cutting member shown in FIGURE 3;

FIGURE 5 is a side view of a different type cutting member which may be used with the holding device;

FIGURE 6 is an end view of the cutting member shown in FIGURE 5; and

FIGURE 7 is an end view of FIGURE 5 showing a modification of the cutting edges.

Referring to FIGURE 1, there is shown a perspective view of the cutting tool wherein the cutting member 10 is assembled in holding device 12.

As best seen in FIGURE 2, the holding device 12 consists of a unitary bushing type clamp pliers made from spring steel, a resilient type pivot at 14, hand grips 16, and a cylindrical channel or passageway 18 for slidably accommodating a cutting member such as 10.

Referring to FIGURES 1, 3 and 4, cutting member 10, which is made from spring steel, is seen to be in the form of a scroll having tapered edges 20 and 22 which with edge 24 form the cutting surfaces of the tool. Edges 20, 22 and 24 are sharpened and are so arranged that a shearing action occurs, as will be explained below. If needed, however, high carbon tool steel inserts for cutting edges 20 and 22 may be used.

FIGURES 5, 6 and 7 show a cylindrical nipper-type cutting member 26 made from spring steel which may be inserted in holder 12 in place of cutter 10. Edges 28 and 30 form the cutting surfaces of member 26 and as such are sharpened. It should be noted that the entire length of edges 28 and 30 need not be sharpened since holder 12 will encompass a substantial part of the length of member 26. FIGURE 7 shows a modification of niper 26 (appearing at the opposite end of FIGURE 5) in that rib reinforcement elements 34 have been added and special steel inserts 36 are used as the cutting elements instead of sharpening edges 28 and 30. Actually the arrangements shown in FIGURES 6 and 7 could appear on opposite ends of a given tool, as in FIGURE 5, or either arrangement could be used at both ends.

In operation, the cutting member 10 (FIGURE 1) is slidably inserted in channel 18 of holder 12. Member 10 is squeezed such that the outer diameter of member 10 is slightly less than the diameter of channel 18 so that member 10 may be properly positioned in channel 18. Upon releasing member 10, it expands due to the spring action of the steel, and a snug fit results between members 10 and 12. When handle grips 16 are squeezed, the scroll cutting member 10 is wrapped more tightly together, thus closing the scissor-type edges 20–24 and 22–24 and producing a shearing action along said edges.

When handle grips 16 are released, member 10 returns to its normal position due to the spring action of the scroll member itself and the spring action of the holder 12.

The operation using the cylindrical cutter 26 (FIGURE 5) is essentially the same as above described. Upon squeezing of the handles 16, cutter 26 is deformed, thus bringing cutting edges 28–30 together in a nipper-type cutting action.

It should be noted that the cutting elements may be proportionalized according to the metal or material cutting requirements. Thus, the present invention permits cutting action closer to the workpiece, is free from play, is simple in construction and operation, and has a high degree of durability and efficiency.

It should be understood that this invention in its broader aspects is not limited to the specific embodiments herein illustrated and described, and that the following claims are intended to cover all changes and modifications that do not depart from the true spirit and scope of the invention.

I claim:

1. A hand tool comprising a unitary piece of solid material including a pivotal section at one end thereof and a pair of handle members adapted to be squeezed toward each other, said pivotal sections encompassing a substantially cylindrical interior passageway;

and a removable, substantially cylindrical cutting tool of resilient material positioned in said passageway having adjacent cutting edges such that when said handle members are squeezed toward each other, the effective circumference of said interior passageway is reduced and said adjacent cutting edges are forced together.

2. A hand tool substantially as set forth in claim 1 wherein said cutting edges comprise hardened metal inserts.

3. A hand tool comprising a unitary piece of solid material including a pivotal section at one end thereof and a pair of handle members adapted to be squeezed toward each other, said pivotal section encompassing a substantially cylindrical interior passageway;

and a removable, substantially cylindrical cutting tool of resilient metal positioned in said passageway having adjacent cutting edges such that when said handle members are squeezed toward each other, the effective circumference of said interior passageway is reduced, thereby forcing said adjacent cutting edges toward each other.

4. A hand tool comprising a unitary piece of solid material including a pivotal section at one end thereof and a pair of handle members adapted to be squeezed toward each other, said pivotal section encompassing a substantially cylindrical interior passageway;

and a removable cutting tool of resilient metal formed into an overlapping cylinder positioned in said passageway, said tool including a first straight cutting edge and a second diagonal cutting edge adjacent to said straight cutting edge such that when said handle members are squeezed toward each other, the effective circumference of said interior passageway is reduced, thereby increasing the overlap of said cutting tool and causing a shearing action between said first and second cutting edges.

References Cited by the Examiner

UNITED STATES PATENTS 2,262,315 11/1941 Davies _____ 30—29.5
3,151,392 10/1964 Chambers _____ 30—240

WILLIAM FELDMAN, *Primary Examiner.*

J. C. PETERS, *Assistant Examiner.*